US006681384B1

United States Patent
Bates et al.

(10) Patent No.: US 6,681,384 B1
(45) Date of Patent: *Jan. 20, 2004

(54) MULTI-THREADED BREAK-POINT

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,839

(22) Filed: Dec. 23, 1999

(51) Int. Cl.[7] .................................. G06F 9/44
(52) U.S. Cl. ................. 717/129; 717/124; 717/126; 717/127; 717/128; 717/130; 717/140; 714/39; 714/47; 714/707; 714/775; 714/35
(58) Field of Search ................. 717/124, 129, 717/127, 128, 130, 126, 131, 151, 140; 714/707, 34, 47, 51, 775, 35

(56) References Cited

U.S. PATENT DOCUMENTS

| | | | |
|---|---|---|---|
| 5,297,274 A | * 3/1994 | Jackson | 703/22 |
| 5,421,014 A | * 5/1995 | Bucher | 709/100 |
| 5,475,845 A | * 12/1995 | Orton et al. | 709/328 |
| 5,519,867 A | * 5/1996 | Moeller et al. | 709/107 |
| 5,586,318 A | * 12/1996 | Toutonghi | 709/107 |
| 6,101,524 A | * 8/2000 | Choi et al. | 709/102 |
| 6,126,328 A | * 10/2000 | Mallory et al. | 717/114 |
| 6,145,123 A | * 11/2000 | Torrey et al. | 717/128 |
| 6,158,045 A | * 12/2000 | You | 717/124 |
| 6,256,775 B1 | * 7/2001 | Flynn | 717/127 |
| 6,282,701 B1 | * 8/2001 | Wygodny et al. | 717/125 |
| 6,330,528 B1 | * 12/2001 | Huang et al. | 703/22 |
| 6,378,006 B1 | * 4/2002 | Murata | 709/321 |
| 6,378,124 B1 | * 4/2002 | Bates et al. | 717/129 |
| 6,378,125 B1 | * 4/2002 | Bates et al. | 717/129 |
| 6,412,106 B1 | * 6/2002 | Leask et al. | 717/124 |
| 6,467,052 B1 | * 10/2002 | Kaler et al. | 714/39 |
| 6,473,820 B1 | * 10/2002 | Zhang | 710/240 |
| 6,493,868 B1 | * 12/2002 | DaSilva et al. | 717/105 |

OTHER PUBLICATIONS

Title: Events response systems: a technique for specifying multi threaded dialogues, author: Hill, ACM, 1987.*
Title: Performance of multi threaded execution in a shared memory multi processor, author: Alkalaj, L. IEEE Symposium on , 1991.*
Title: High level debugging in parasight, author: Ziya Aral, source: ACM SIGPLAN, Nov. 1988.*
Title: Performance measurements for multithreaded programs, author: Ji et al, source: ACM, Jun. 1996.*
Title: Event and state based debuggibg in TAU: a prototype, Authors Shende et al, ACM, 1996.*
Title: Debuggable concurrency extensions for standard ML, author: Tolmach et al, ACM, 1991.*
Bates, et al, IBM Patent Application Ser. No. 09/225,884 (RO998–192), filed Jan. 5, 1999, "Breakpoint Governor for Multi–User Debugging Environment".
Bates, et al, IBM Patent Application Se. No. 09/255,109 (RO998–208), filed Feb. 22, 1999, "Debugger Thread Monitor".

\* cited by examiner

Primary Examiner—Chameli C Das
(74) Attorney, Agent, or Firm—Owen J. Gamon; Roy W. Truelson

(57) ABSTRACT

A way to synchronize threads in a multi-threaded program. In the preferred embodiment, a debugger provides a break-point that does not interrupt the user when the first thread reaches it; instead, the debugger halts this thread at the break-point and waits for other threads to accumulate at the break-point before the debugger notifies the user. The user can specify a condition under which this notification should occur; for example, when a specific thread or a certain number of threads have accumulated at the break-point. Once the condition is satisfied, the debugger suspends other threads that have not reached the break-point. The debugger then provides for synchronized stepping or running of the threads that are halted at the break-point.

32 Claims, 16 Drawing Sheets

MULTI-THREADED BREAK-POINT

FIELD OF THE INVENTION

The invention is generally related to computers and computer software. More specifically, the invention is generally related to debugging multi-threaded software.

BACKGROUND OF THE INVENTION

Locating, analyzing, and correcting suspected faults, called "bugs", in a computer program is a process known as "debugging." Typically, a programmer uses a tool commonly known as "debugger" to debug a program under development.

Conventional debugging tools typically support two primary operations to assist a computer programmer. A first operation supported by conventional debuggers is a "step" function, which permits a programmer to process instructions (also known as "statements") in a computer program one-by-one and to see the results upon completion of each instruction. While the step function provides a programmer with a large amount of information about a program during its execution, stepping through hundreds or thousands of program instructions can be extremely tedious and time consuming, and might require a programmer to step through many error-free instructions before a set of suspicious instructions to be analyzed are executed.

To address this difficulty, a second operation supported by conventional debuggers is a break-point function, which permits a programmer to identify with a break-point the precise instruction at which the programmer desires to halt execution of the program. As a result, the debugger executes the program in a normal fashion until a break-point is reached, and then the debugger stops execution and displays the results of the program to the programmer for analysis.

Typically, step operations and break-points are used together to simplify the debugging process. Specifically, the programmer sets a break-point at the beginning of a desired set of instructions to be analyzed and then begins executing the program. Once the break-point is reached, the debugger halts the program, and the programmer then steps through the desired set of instructions line-by-line using the step function in the debugger. Consequently, a programmer is able to quickly isolate and analyze a particular set of instructions without needing to step through irrelevant portions of a computer program The break-point and step operations work well when the entire program being debugged runs in a single thread. But, some operating systems allow multiple parts, or threads, of one or more programs to run simultaneously. These operating systems are referred to as multi-threaded, which is a type of parallel processing that allows for more straightforward software design and faster execution of such programs on multi-processor computers.

Debugging multi-threaded computer programs is difficult since timing (i.e., synchronization) problems between the threads can occur, which can be very difficult to reproduce. For example, the debugging environment might interfere with the synchronization of the threads. Many reasons for this interference with the synchronization can be present. For example, the computer system upon which the computer program is being debugged might have different performance characteristics than the intended, ultimate host for the computer program. Also, the debugging environment includes additional monitoring and control over program execution, which can impede the intended execution of threads.

Not only do debuggers introduce synchronization problems, but the programmer might be interested in evaluating specific synchronization situations that could possibly occur. But, the programmer does not want to alter the design of the program to force a specific, synchronization situation; instead, the programmer wants a temporary synchronization debugging method. For example, the programmer might want to evaluate how the computer program would behave when multiple threads of interest are utilizing sections of code simultaneously.

Another reason why thread synchronization during debugging might be necessary is when an incomplete computer program is being debugged. The amount of code in a computer program can be enormous, so programmers often combine a top-down design technique with a bottom-up testing technique because it would be impractical to wait for the entire computer program to be available in order to test it. Using the top-down design approach, each subfunction within the program is defined, including the interfaces to other subfunctions. A programmer would then write the lower-tier sections of the computer program, such as modules. Using the bottom-up testing approach, as these lower-tier sections are completed, larger amounts of the computer program are debugged. Sections or modules of a computer program that are not yet complete are merely represented with "stubs" in order to exercise the defined interfaces.

Unfortunately, synchronization situations expected in the full computer program can be difficult to replicate in the incomplete computer program because such stubs would not perform like the full computer program. For example, a stub routine called by the computer program might only return a constant value whereas the real routine, when later available, would perform a number of calculations and processing steps that would delay such a response. The programmer would like to synchronize execution of a thread executing this stub routine to be more like the expected performance, but does not want to waste time developing elaborate code for the stub that would ultimately be discarded.

One technique for debugging synchronization problems is for a user to set a break-point and allow a first thread to hit it. The user then manually suspends the first thread and commands the program to continue executing until a second thread hits the break-point. The user then releases the first thread allowing both threads to execute. But, this manual approach has several problems. First, it is inconvenient for the user. Second, even having manually created the synchronized thread condition of interest, the suspected fault may not manifest itself until many repetitions. Third, the number or identity of threads suspected of causing the fault could be numerous, making this manual synchronization impractical. Finally, deadlock can occur if the second thread is waiting for the first thread, which is in a suspended state, so the user must manually release the first thread in order to free the deadlock problem.

Thus, a significant need exists for controlling the synchronization of threads, so that multi-threaded applications can be debugged more easily.

SUMMARY OF THE INVENTION

The invention is a way to synchronize threads in a multi-threaded program. In the preferred embodiment, a debugger provides a break-point that does not interrupt the user when the first thread reaches it; instead, the debugger halts this thread at the break-point and waits for other threads to accumulate at the break-point before the debugger notifies the user. The user can specify a condition under which this notification should occur; for example, when a specific thread or a certain number of threads have accumulated at the break-point. Once the condition is satisfied, the debugger suspends other threads that have not reached the break-point. The debugger then provides for synchronized stepping or running of the threads that are halted at the break-point.

BRIEF DESCRIPTION OF THE DRAWINGS

FIGS. 9a-1 and 9a-2 (hereinafter 9a) and 9b are flow diagrams of the break-point manager routine performed on the computer system of FIG. 1.

DETAILED DESCRIPTION

Technology Overview

Figure 1:
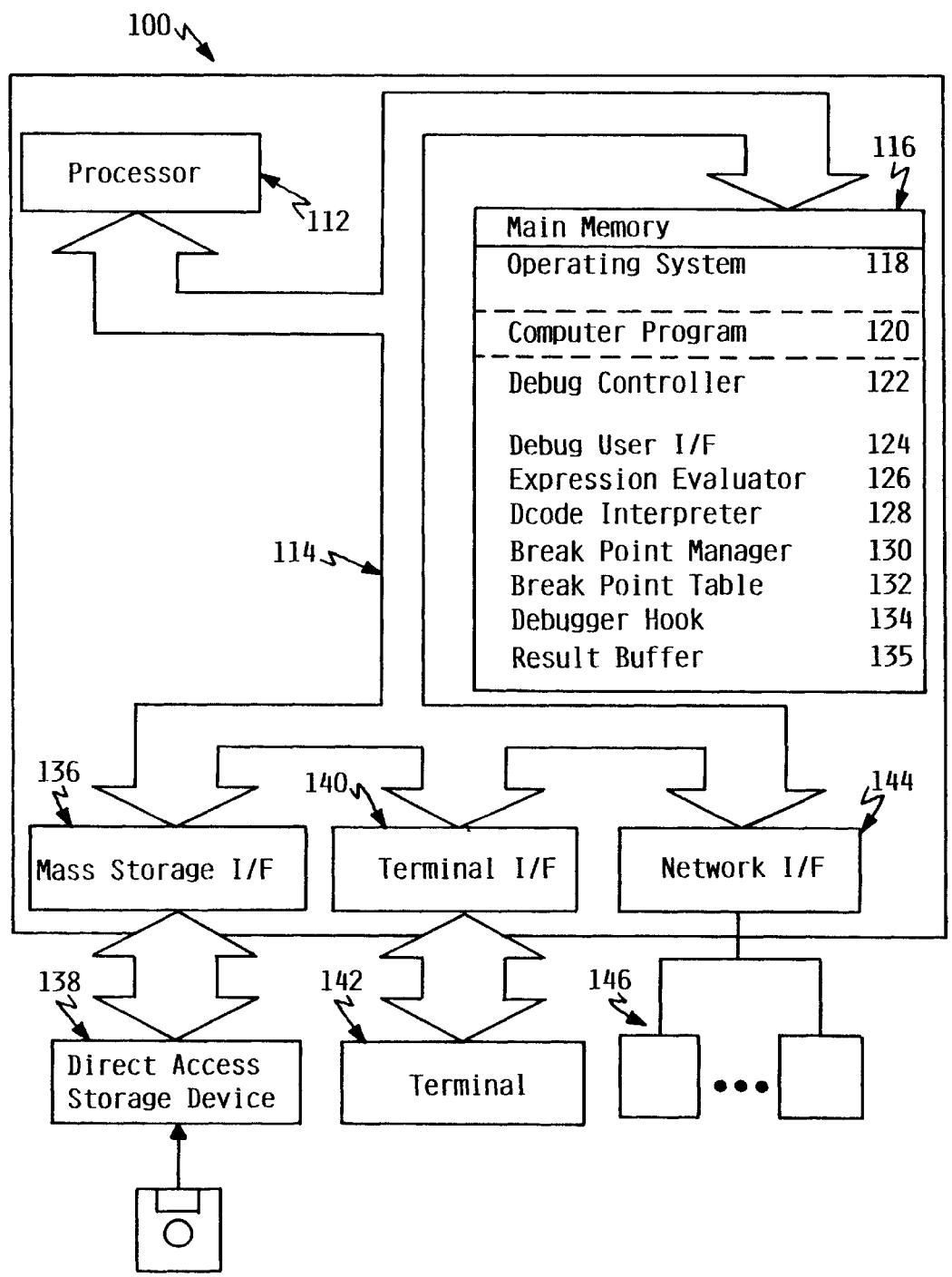
FIG. 1 is a block diagram of a computer system consistent with the preferred embodiment.

Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and to see the results upon completion of each instruction. While the step function provides a programmer with a large amount of information about a program during its execution, stepping through hundreds or thousands of program instructions can be extremely tedious and time consuming, and might require a programmer to step through many program instructions that are known to be error-free before a set of instructions to be analyzed are executed.

To address this difficulty, a second operation supported by conventional debuggers is a break-point operation, which permits a computer programmer to identify with a "break-point" a precise instruction for which the programmer desires to halt execution of the program during execution. As a result, the debugger executes the program in a normal fashion until a break-point is reached, and then the debugger stops execution and displays the results of the program to the programmer for analysis.

Typically, step operations and break-points are used together to simplify the debugging process. Specifically, a common, debugging operation is to set a break-point at the beginning of a desired set of instructions to be analyzed and then begin executing the program. Once the break-point is reached, the program is halted, and the programmer then steps through the desired set of instructions line-by-line using the step function. Consequently, a programmer is able to quickly isolate and analyze a particular set of instructions without needing to step through irrelevant portions of a computer program.

Most break-points supported by conventional debuggers are unconditional, meaning that once such a break-point is reached, execution of the program is always halted. Some debuggers also support the use of conditional break-points, which only halt execution of a program when a variable used by the program is set to a predetermined value at the time such a break-point is reached.

Some operating systems, such as UNIX and Windows NT, allow multiple parts, or threads, of one or more processes to run simultaneously. These operating systems are referred to as multi-threaded, which is a type of parallel processing that allows for more straightforward software design and faster execution of such programs on multi-processor computers.

Synchronization of multi-threaded computer programs is typically provided by semaphores. A semaphore is a token that is used in a multi-threaded operating system to coordinate access, by competing threads, to "protected" resources or operations. This coordination may be used to limit the number of threads that can execute a piece of code at the same time. The typical limit is one, creating a mutually-exclusive lock. Semaphores are also used to impose the order in which a series of interdependent operations are performed. Thus, a semaphore acts as a key that a thread must acquire to continue execution. Any thread that can identify a particular semaphore can attempt to acquire it by passing to the semaphore function a system-wide number that is assigned when the semaphore is created. The function does not return until the semaphore is actually acquired. Alternatively, a semaphore can specify a time limit after which the semaphore is released.

The term semaphore generally refers to a function used to halt execution of a section of code until a condition is satisfied releasing the semaphore function. "Semaphore" and "mutex" are often used interchangeably, but a mutex is actually a broader concept that includes tracking the semaphore function using data structures, evaluating the condition holding completion of the semaphore function, and scheduling the release of threads queued by the semaphore function.

Debugging multi-threaded computer programs is difficult since timing (i.e., synchronization) problems can occur, which can be very difficult to reproduce. For example, the debugging environment may interfere with the synchronization in the design of the computer program. Many reasons for this interference with the synchronization may be present, such as the computer system upon which the computer program is being debugged is different in performance from the intended, ultimate host for the computer program. Also, the debugging environment includes additional monitoring and control over program execution, which can necessarily impede the intended execution of threads.

Not only do debuggers introduce synchronization problems, but the programmer may be specifically interested in evaluating specific synchronization situations that could possibly occur. But, the programmer does not want to alter the design of the program to force a specific synchronization situation; instead, the programmer wants a temporary, synchronization debugging method. For example, the programmer may want to evaluate how the computer program would behave when multiple threads of interest are utilizing sections of code simultaneously. This might occur, for example, when multiple instances of a program are running or when a single program is broken up into multiple sections of code, which execute simultaneously.

Another reason why thread synchronization during debugging might be necessary would be when an incomplete computer program is being debugged. Sections or modules of a computer program may merely be represented with "stubs" to exercise the interfaces. But, such stubs would not perform like the full computer program. For example, a tactical fighter-aircraft mission-avionics system integrates a large number of displays, navigational aids, communication systems, weapons delivery systems, crew comfort, and other systems. The amount of code required to control these many functions is large, so the software development approach is generally a top-down design with bottom-up testing. Thus, each subfunction required to perform these tasks is defined, including the interfaces to other subfunctions. A programmer would then write the lower-tier sections of the computer program, such as a module. As these lower-tier sections are completed, larger amounts of the computer program are debugged and tested. It would be impractical to wait for the entire computer program to be available in order to debug. Often, some functions may be delayed for years after a flyable computer program is required.

Unfortunately, synchronization situations expected in the full computer program may be difficult to replicate in the incomplete computer program. For example, a stub routine called by the computer program might return a constant value whereas the real routine, when available, would perform a number of calculations and processing steps that would delay such a response. The programmer would like to synchronize execution of a thread executing this stub routine to be more like the expected performance, but does not want to waste time developing elaborate code for the stub that would ultimately be discarded.

One manner of debugging synchronization problems is for a user to set a break-point and allow a first thread to hit it. The user then manually suspends the first thread and commands the program to continue executing until a second thread hits the break-point. The user then releases the first thread allowing both threads to execute. But, this manual approach has several problems. First, it is inconvenient for the user. Second, even having manually created the synchronized thread condition of interest, the suspected fault may not manifest itself until many repetitions. Third, the number or identity of threads suspected of causing the fault could be numerous, making this manual synchronization impractical. Finally, deadlock can occur if the second thread is waiting for the first thread, which is in a suspended state, so the user must manually release the first thread in order to free the deadlock problem.

Preferred Embodiment

Turning to the Drawings, wherein like numbers denote like parts throughout the several views, FIG. 1 illustrates computer system 100 consistent with the preferred embodiment. Computer system 100 is shown for a multi-user programming environment that includes at least one processor 112, which obtains instructions and data via system bus 114 from main memory 116. Processor 112 could be any type of processor, such as those implemented in a PC, a server, a minicomputer, a midrange computer, or a mainframe computer. Main memory 116 includes operating system 118, computer program 120, and debug controller 122. Debug controller 122 provides a way to debug computer program 120, or computer code, by providing tools for locating, analyzing, and correcting faults. Debug controller 122 provides thread synchronization by the cooperation of debug user interface 124, expression evaluator 126, dcode interpreter 128, break-point manager 130, break-point table 132, debugger hook 134, and result buffer 135. The threads are suspended and released selectively by break-point manager 130. Break-point table 132 is further described below under the description for FIG. 4.

Processor 112 is suitably programmed to carry out the preferred embodiment by debug controller 122, as further described in the flowcharts of FIGS. 9–13. In the alternative, the functions of FIGS. 9–13 could be implemented by control circuitry through the use of logic gates, programmable-logic devices, or other hardware components in lieu of a processor-based system.

Referring again to FIG. 1, although debug controller 122 is drawn as being separate from operating system 118, they could be packaged together. The organization of controller 122 is further described below under the description of FIG. 2.

Main memory 116 could be one or a combination of memory devices, including Random Access Memory, non-volatile or backup memory (e.g., programmable or flash memories and read-only memories). In addition, memory 116 may be considered to include memory storage physically located elsewhere in computer system 100, e.g., any storage capacity used as virtual memory or stored on a mass storage device, such as direct access storage device 138, or on another computer coupled to computer system 100 via network 144.

Computer system 100 could include a number of operators and peripheral systems as shown for example by a mass-storage interface 136, operably connected to direct-access storage device 138, by terminal interface 140, operably connected to terminal 142, and by a network interface 144, operably connected to a plurality of networked devices 146. Terminal 142 and networked devices 146 could be, for example, desktop or PC-based computers, workstations, or network terminals, or other networked computer systems. Mass storage interface 136, terminal interface 140, and network interface 144 are connected to processor 112 and main memory 116 via system bus 114.

Computer system 100 can represent practically any type of computer, computer system or other programmable electronic device, including a client computer, a server computer, a portable computer, or an embedded controller. Computer system 100 can be a stand-alone device or networked into a larger system.

In general, the routines executed to implement the embodiments of the invention, whether implemented as part of an operating system or a specific application, component, program, object, module or sequence of instructions, will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal-bearing media used to actually carry out the distribution. Examples of signal-bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links, including wireless communication links. An example of signal-bearing media is shown as direct-access storage device 138.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
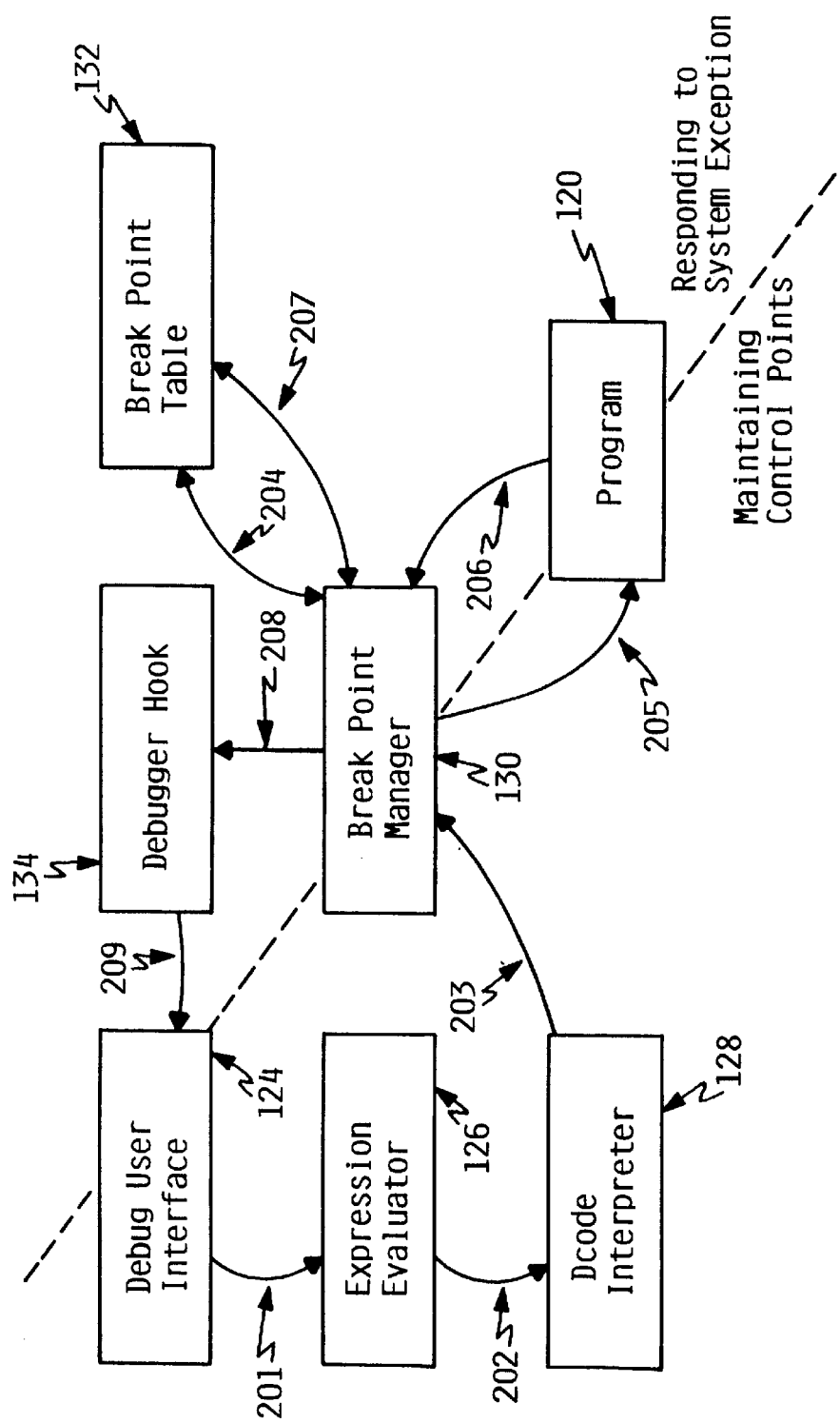
FIG. 2 is a block diagram of an exemplary software environment for the computer system of FIG. 1.

Referring to FIG. 2, an exemplary software environment is shown for computer system 100 of FIG. 1. Referring again to FIG. 2, specifically, thread synchronizing capability is illustrated in block-diagram form, with the elements shown that contribute to maintaining break-points (e.g., creating and deleting) and to responding to a system exception. Debug user interface 124 is shown initiating the process, providing at Phase 201 any break-points to be established. In some instances, the user may define these break-points by issuing a debugger command that refers to high-level language (HLL) references such as line or statement numbers or software object references such as a program or module name, from which the physical storage address may be cross referenced. The debugger command could be issued on a command line or through a graphical user interface. The illustrative embodiment described below shows a user providing statement-number references from which memory addresses are cross referenced. The interface provided by debug user interface 124 is further described in FIGS. 3a and 3b.

Referring again to FIG. 2, at Phase 202, expression evaluator 126 parses this debugger command using a table that was produced by a compiler stored with computer program 120 to map the line number in the debugger command to the actual physical storage address in memory 116. Dcode interpreter 128 at Phase 203 passes on the break-point information to break-point manager 130, which in turn updates break-point table 132 at Phase 204. The operation of break-point manager 130 is further described in FIGS. 9–13. Referring again to FIG. 2, at Phases 203 and 205, dcode interpreter 128 runs a dcode program to control break-point manager 130 to set the break-points in program 120.

After the control points are set, the user provides an input that resumes execution of program 120. As represented at Phase 206, execution of the program eventually results in an encounter of a break-point. In the illustrative embodiment, this is accomplished by an invalid op-code in program 120 causing a system exception. An interrupt handler, or similar means, passes information regarding the exception or interrupt to break-point manager 130. Break-point manager 130 references and updates break-point table 132 at Phase 207 as required in order to determine what type of break-point was encountered and the associated processing.

Then, at Phase 208, break-point manager 130 utilizes debugger hook 134 in order to obtain debugger commands, especially when a break-point has halted program execution. Debugger hook 134 prompts debug user interface 124 at Phase 209. The additional step of debugger hook 134 is illustrated for instances where an interface is required between user interface 124 and the other portions of debug controller 122. Debugger hook 134 utilizes the result buffer 135 to cache data for debug user interface 124.

Figure 3A:
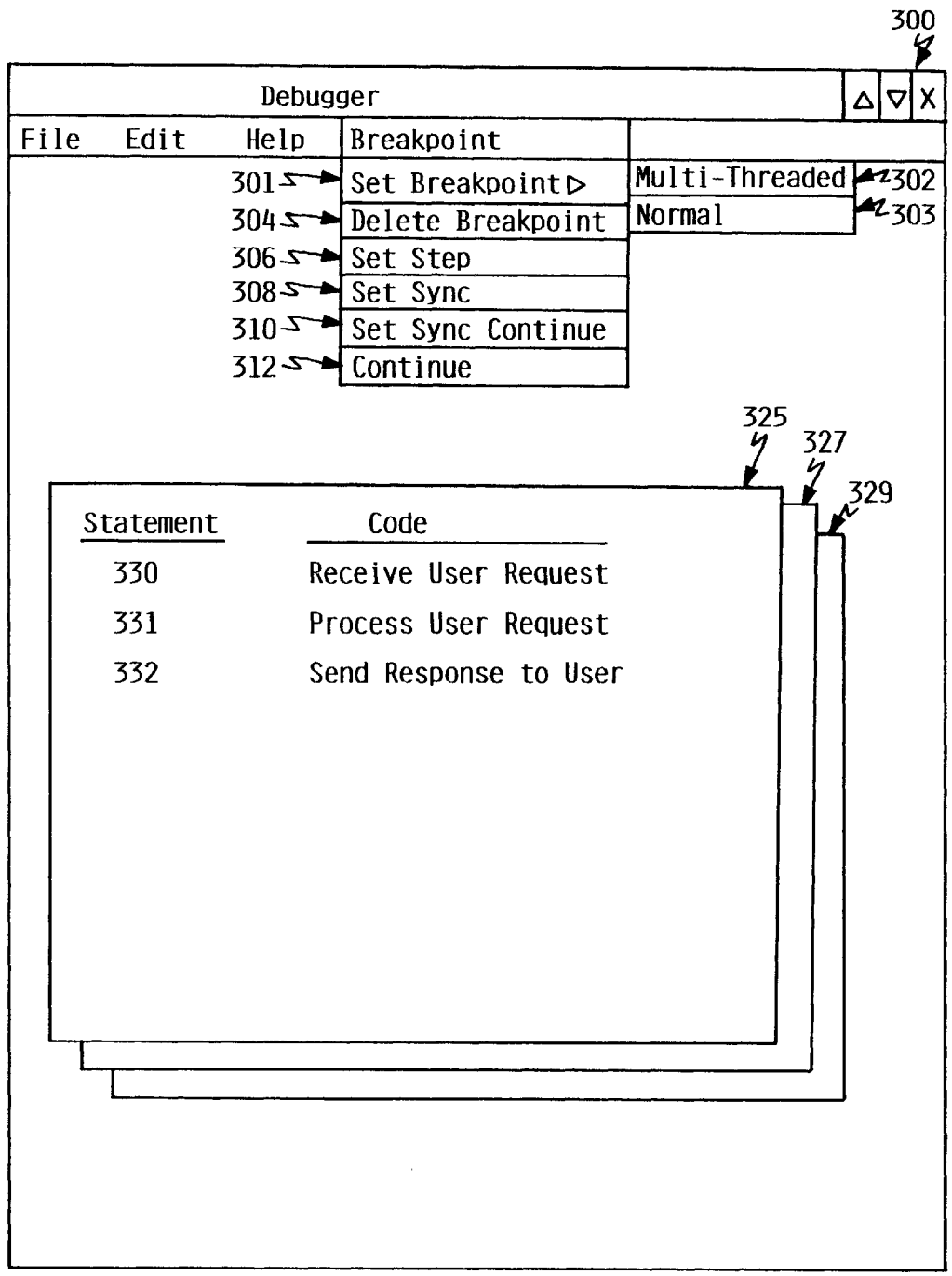
FIGS. 3a and 3b are pictorial illustrations of an exemplary graphical user interface used to control the preferred embodiment.

FIG. 3a illustrates a user interface provided by debug user interface 124. The user interface illustrated is an example only, and many debugger user interfaces could be employed.

FIG. 3a illustrates debugger window 300 containing the break-point commands set break-point 301, multi-threaded command 302, normal command 303, delete break-point command 304, set step command 306, set sync command 308, set sync continue command 310, and continue command 312.

Debugger window 300 also shows a portion of computer program 120 having statement numbers 330, 331, and 332. Three threads of the same computer program are shown: threads 325, 327, and 329, although any number of threads could be executing. For the purpose of clarity, all three threads are shown in this illustration, but not all debuggers show threads within the debugger window. In this example, computer program 120 is responding to a request from a user, but any type of computer program could be debugged. In this example, each thread is an identical copy of the program that is handling a different user. Although the statements illustrated are at an extremely high level, the statements could be at a lower lever, for example in a language such as C++ or in assembly language.

When the user selects set break-point 301, debug user interface 124 displays multi-threaded break-point option 302 and normal break-point option 303. When the user selects normal break-point option 303, debug controller 122 handles non multi-threaded breakpoints.

Figure 3B:
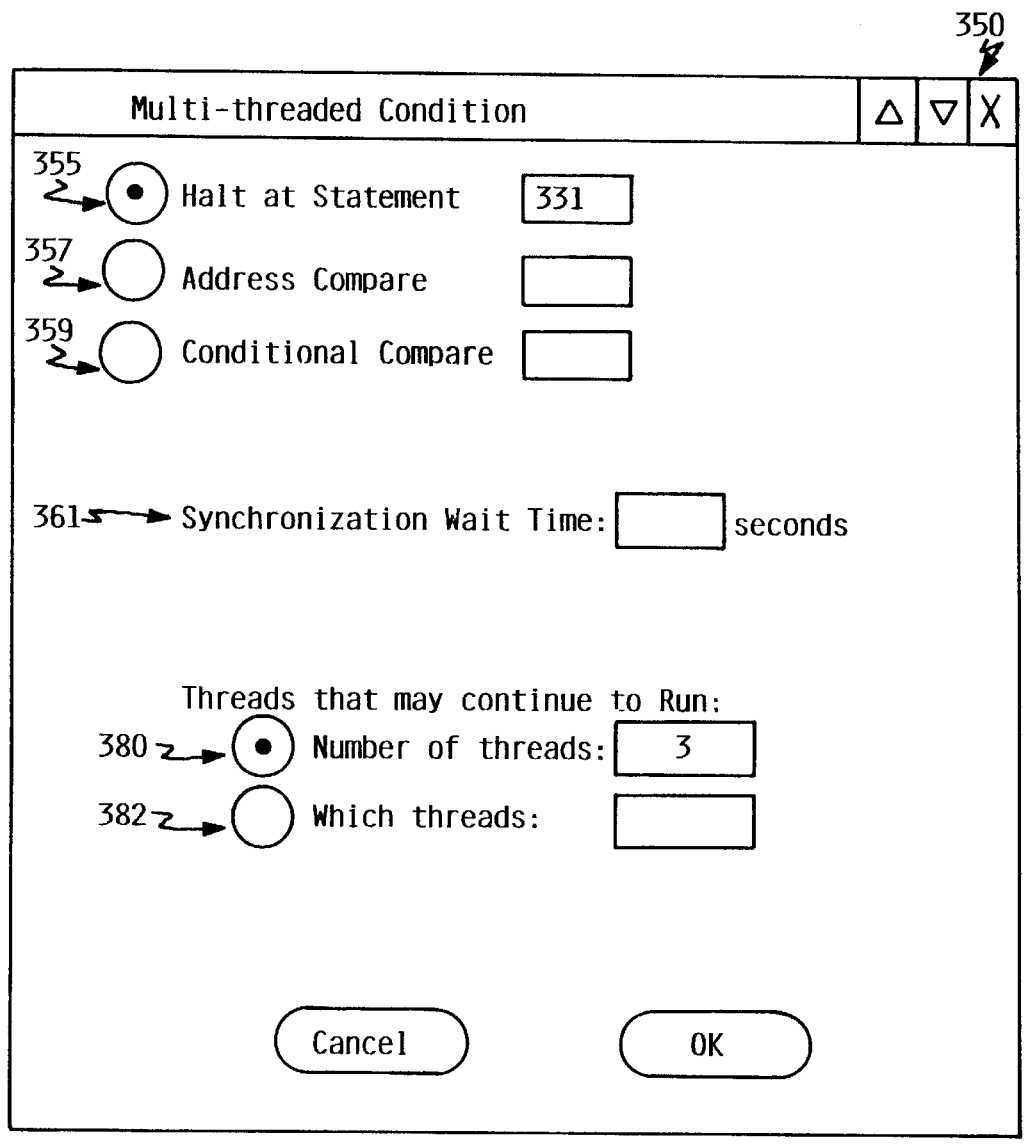

When the user selects multi-threaded break-point 302, debug user interface 124 displays the dialog shown in FIG. 3b, which allows the user to set a multi-threaded break-point along with the conditions under which the break-point will cause execution of the threads to be suspended.

Referring again to FIG. 3a, when the user selects delete break-point 304, debug controller 122 releases any threads waiting on this break-point, which allows these threads to resume executing instructions when program execution continues. Debug controller 122 also removes the specified entry from break-point table 132, as further described below under the description for FIGS. 4 and 9.

Referring again to FIG. 3a, when the user selects set step 306, debug controller 122 processes a step function. The operation of debug controller 122 in response to the set step command is further described below under the description for FIG. 9. An example of the operation of the step function is further described below under the description for FIG. 5.

Referring again to FIG. 3a, when the user selects set sync 308, debug controller 122 processes a sync function. The operation of debug controller 122 in response to set sync command 308 is further described below under the description for FIG. 9. An example of the operation of the sync function is further described below under the description for FIG. 6.

Referring again to FIG. 3a, when the user selects set sync continue 310, debug controller 122 processes a sync continue function. The operation of debug controller 122 in response to set sync continue command 310 is further described below under the description for FIG. 9. An example of the operation of the sync continue function is further described below under the description for FIG. 7.

Referring again to FIG. 3a, when the user selects continue 312, debug controller 122 processes a continue function. The operation of debug controller 122 in response to continue command 312 is further described below under the description for FIG. 9. An example of the operation of the continue function is further described below under the description for FIG. 8.

FIG. 3b is a graphical illustration of dialog window 350, which user interface 124 displays in response to the user selecting multi-threaded command 302. Dialog window 350 allows the user to request debug controller 122 to insert a multi-threaded break-point into the program being debugged. Dialog window 350 also allows the user to specify the circumstances under which debug controller 122 will allow other threads to continue to run after a first thread hits the specified break-point breakpoint.

Dialog window 350 contains halt-at-statement 355, which allows the user to specify the statement number where debug controller 122 is to insert the break-point in the program being debugged. In this example, the user has entered "331", which corresponds to statement number 331 in FIG. 3a.

Referring again to FIG. 3b, dialog window 350 further contains address compare 357, which allows the user to specify a program variable. Debug controller 122 will activate a break-point when the program stores to the memory pointed to by the address of the variable.

Dialog window 350 further contains condition 359, which allows the user to specify a condition that debug controller will check when determining when to activate a break-point. For example, if the user specifies "I<5" in condition 359, debug controller 122 would then allow the threads to execute until the program variable "I" is less than 5, at which time debug controller 122 will activate a break-point and call debugger hook 134, which displays the user interface.

Dialog window 350 also contains number-of-threads 380, which allows the user to specify the total number of threads that must hit the specified break-point before debug controller 122 will suspend operation of any threads still executing. An example of the result of the user selecting number-of-threads 380 is further described below under the description of FIG. 5.

Referring again to FIG. 3b, dialog window 350 also contains specified-threads 382, which allows the user to specify which threads must hit the break-point before debug controller 122 will suspend operation of any threads still executing.

Dialog window 350 also contains synchronization wait-time 361, which allows the user to specify an amount of time. For example, the user might specify three seconds in synchronization wait time 361. Then, when a break-point is hit, debug controller 122 would wait a maximum of the specified time or until all the threads hit the break-point, whichever comes first. If the specified threads do not hit the break-point within wait time 361, then debug controller 122 releases all the threads that have hit the break-point. Synchronization wait-time 361 can also be used in conjunction with number-of-threads 380 or specified threads 382, so that debug controller 122 waits a maximum of the specified time or until the number of threads is satisfied or until the specified threads hit the break-point, whichever comes first.

Figure 4:
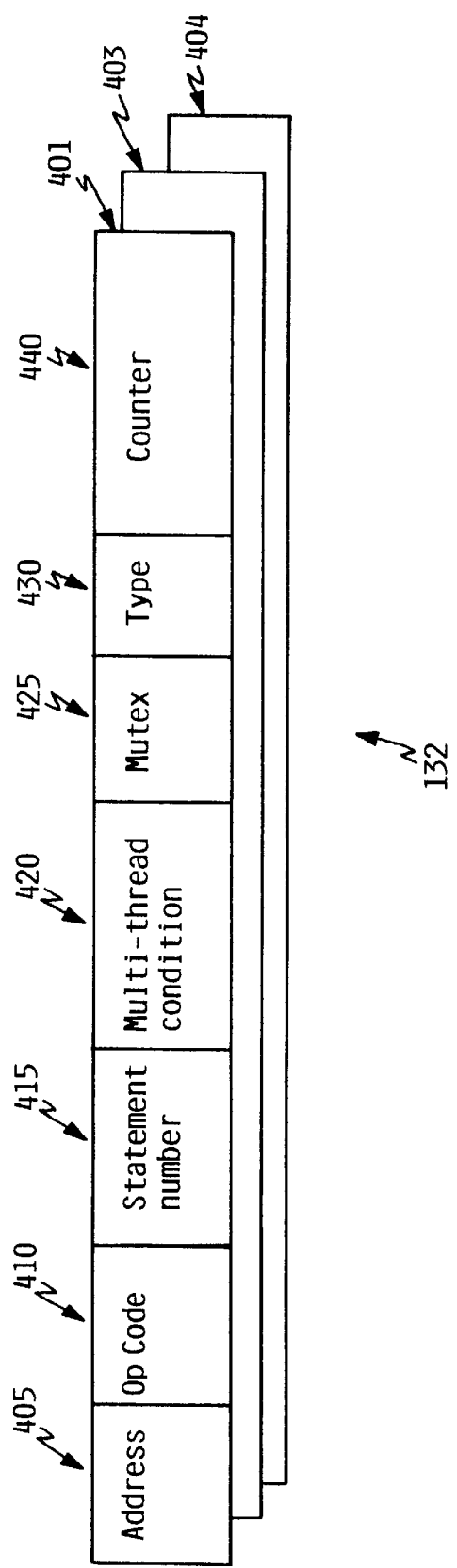
FIG. 4 is a block diagram of a data structure for the break-point table of FIGS. 1 and 2.

Referring to FIG. 4, a data structure for break-point table 132 referenced in FIGS. 1 and 2 is illustrated. Three entries: 401, 403, and 404 in break-point table 132 are shown, although any number could be present. Fields provided for each break-point record entry include address field 405 representing the physical storage location for the instruction in program 120 at which the break-point is activated. Debug controller 122 will reference address field 405 when a system exception occurs at the specific address. When a system exception occurs, debug controller 122 presumes that execution of program 120 has hit the break-point.

Also provided in break-point table 132 is op code field 410 for storing the original instruction replaced in computer program 120 at address 405. Statement-number field 415 stores the statement number where the user would like a break-point set. The statement number maps to address 405 in program 120. Multi-thread condition field 420 is used by debug controller 122 to tie together multiple records in break-point table 132 when a plurality of synchronization break-points are used. Mutex field 425 is used by debug controller 122 to coordinate the suspension of threads, as further described below under the description for FIGS. 9–13. Referring again to FIG. 4, type field 430 is used by debug controller 122 to store the type of break-point that the user has requested: either normal or multi-threaded. Counter field 440 is used by debug controller 122 to count the number of synchronized threads when processing the sync step command, as further described below under the description for FIG. 13.

The table of FIG. 4 is merely for illustration. Some embodiments would provide fewer or more types of break-point data. In addition, this information could be contained in one or more data structures of various compositions.

Figure 5:
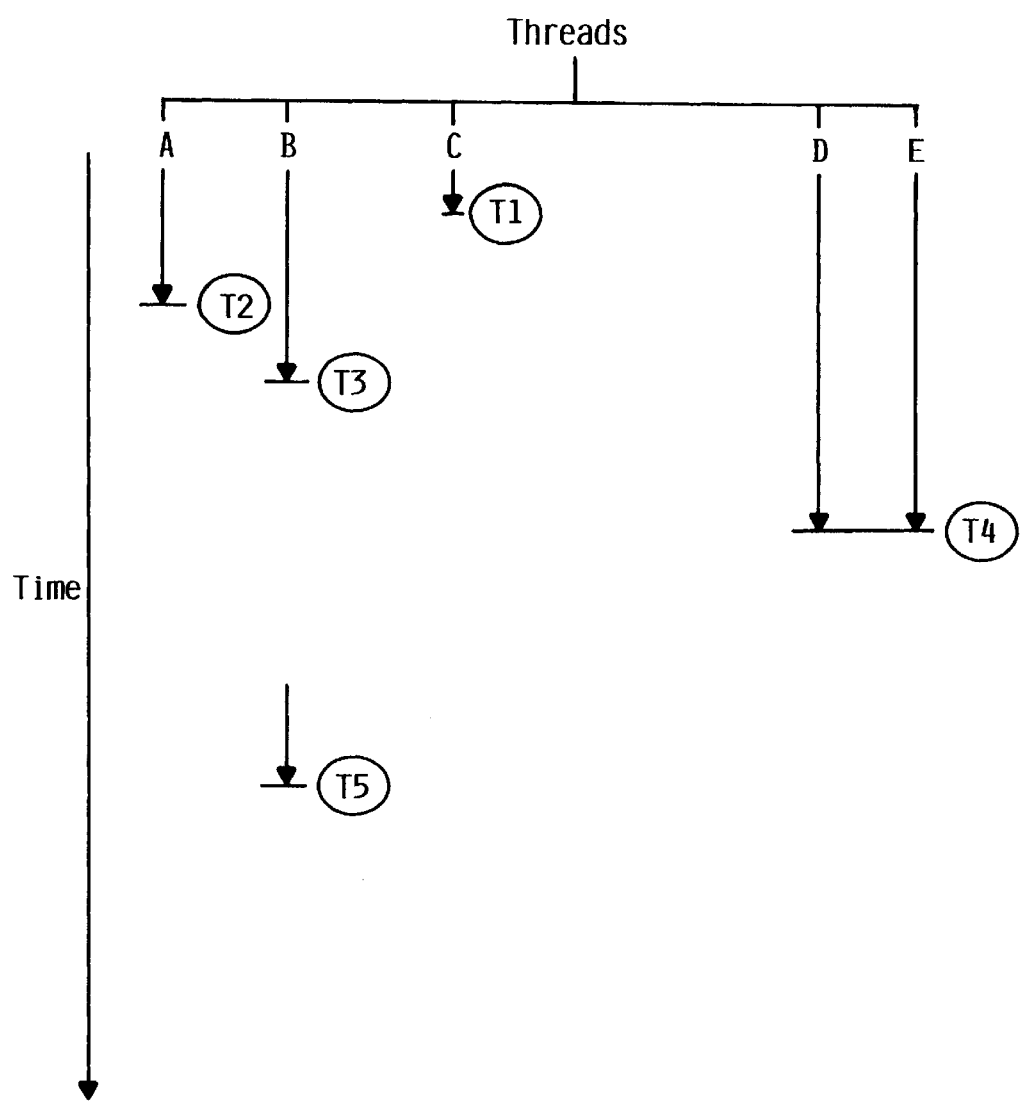
FIG. 5 is an illustrative example of using "set step" synchronization break-points, according to the preferred embodiment.

Referring to FIG. 5, a processing example for set step command 306 is illustrated. A depiction is made of five threads A, B, C, D, and E simultaneously executing after the user has entered a multi-threaded break command using, for example, halt-at-statement 355 set to "331" and number-of-threads 380 set to "3". Time T1 is earlier than time T2, which is earlier than time T3, which is earlier than time T4, which is earlier than time T5.

At time T1, thread C hits the synchronization break-point at statement 331. Debug controller 122 suspends thread C, as further described below under the description for FIG. 12, but does not suspend other threads because the break-point condition is not yet satisfied, i.e., only one and not three threads have hit the break-point.

Referring again to FIG. 5, at time T2, thread A also hits the synchronization break-point at statement 331. Debug controller 122 also suspends thread A, but does not suspend other threads, because the break-point condition is not yet satisfied, i.e., only two and not three threads have hit the break-point.

Then at time T3, thread B hits the synchronization break-point at statement number 331. Debug controller 122 also suspends thread B. The break-point condition for all three threads (A, B, and C) is now satisfied and three threads are suspended. As a result, all three are synchronized.

As a result of three threads hitting the break-point, so that the condition is satisfied, debug controller 122 suspends threads D and E at time T4, even though they have not yet hit the break-point at statement 331. Although threads D and E are drawn as suspended at the same time, time T4, they could also be suspended at different times.

Since thread B was the last thread to hit the multi-threaded break-point, thread B is the current thread of focus, so debug controller 122 brings up the user interface for thread B. In this example, the user chooses set step command 306 from the user interface, which causes debug controller to allow thread B to execute one or more instructions until program 120 reaches the next statement at time T5. At time T5, debug controller 125 suspends execution of thread B and brings up the user interface, so that the user can select another command.

Figure 6:
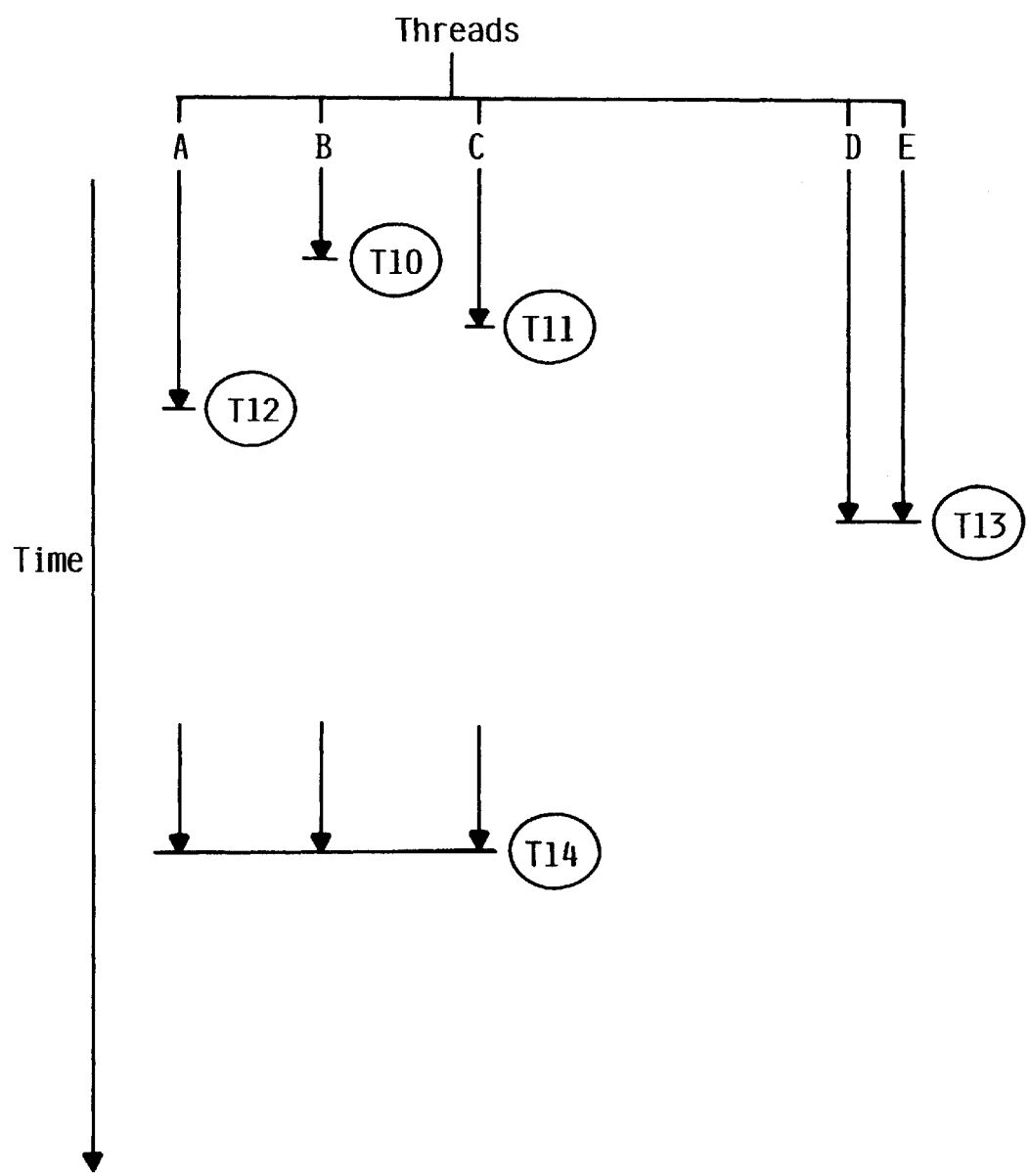
FIG. 6 is an illustrative example of using "sync step" synchronization break-points, according to the preferred embodiment.

Referring to FIG. 6, a processing example for set sync step command 308 is illustrated. A depiction is made of five threads A, B, C, D, and E simultaneously executing after the user has entered a multi-threaded break command using, for example, halt-at-statement 355 set to statement "331" and number of threads set to "3". Time T10 is earlier than time T11, which is earlier than time T12, which is earlier than time T13, which is earlier than time T14.

At time T10, thread B hits the synchronization break-point at statement 331. Debug controller 122 suspends thread B, as further described below under the description for FIG. 12, but does not suspend other threads, because the break-point condition is not yet satisfied, i.e., only one and not three threads have hit the break-point.

Referring again to FIG. 6, at time T11, thread C also hits the synchronization break-point at statement 331. Debug controller 122 also suspends thread C, but does not suspend other threads, because the break-point condition is not yet satisfied, i.e., only two and not three threads have hit the break-point.

Then at time T12, thread A hits the synchronization break-point at statement number 331. Debug controller 122 also suspends thread A. The break-point condition for all three threads (A, B, and C) is now satisfied and three threads are suspended. As a result, all three are synchronized.

As a result of three threads hitting the break-point, so that the condition is satisfied, debug controller 122 suspends threads D and E at time T13, even though they have not yet hit the break-point at statement 331. Since thread A was the last thread to hit the multi-threaded break-point, thread A is the current thread of focus, so debug controller 122 brings up the user interface for thread A. In this example, the user chooses set sync command 308 from the user interface, which causes debug controller to allow threads A, B, and C to execute one or more instructions until program 120 reaches the next statement at time T14. Thus, threads A, B, and C are stepped in a synchronized manner to the next statement At time T14, debug controller 125 suspends execution of threads A, B, and C, and brings up the user interface, so that the user can select another command.

Figure 7:
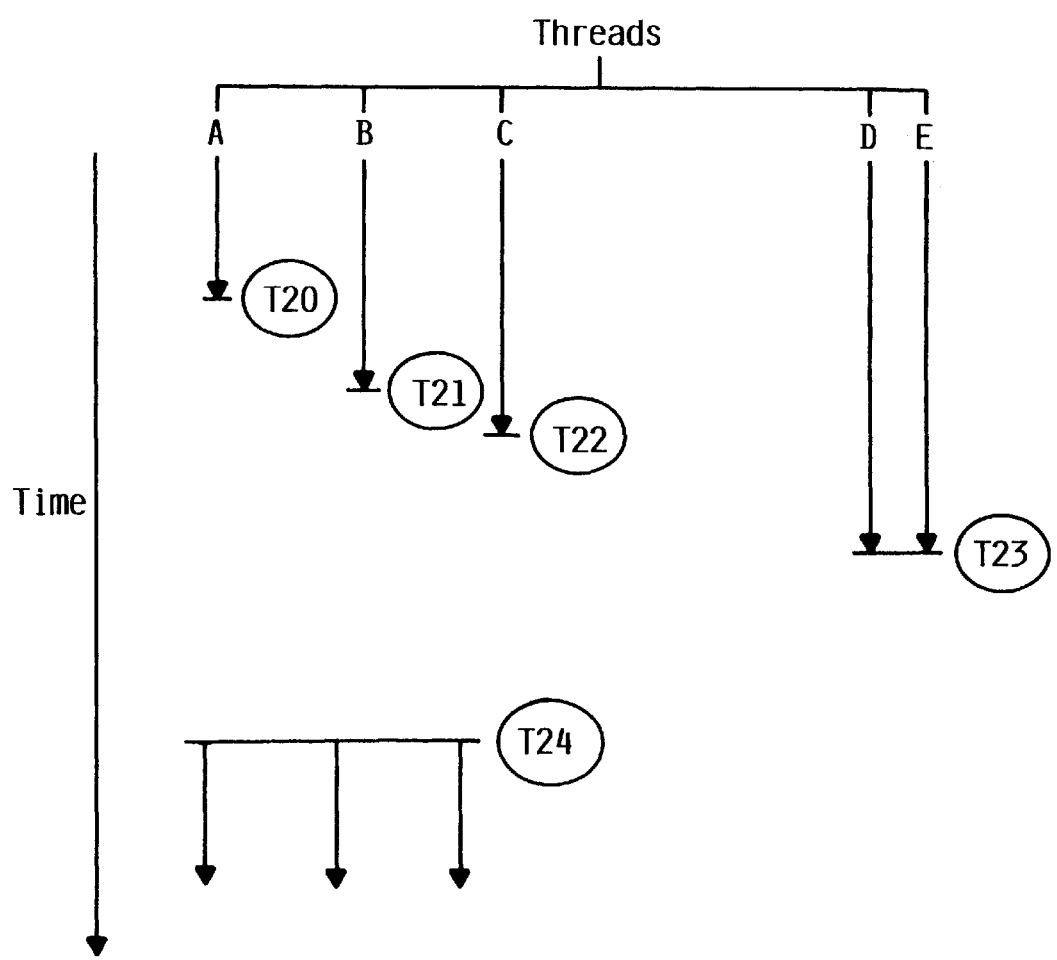
FIG. 7 is an illustrative example of using "sync continue" synchronization break-points, according to the preferred embodiment.

Referring to FIG. 7, a processing example for sync continue command 310 illustrated. A depiction is made of five threads A, B, C, D, and E simultaneously executing after the user has entered a multi-threaded break command using, for example, halt-at-statement 355 set to statement "331" and number of threads set to "3". Time T20 is earlier than time T21, which is earlier than time T22, which is earlier than time T23, which is earlier than time T24.

At time T20, thread A hits the synchronization break-point at statement 331. Debug controller 122 suspends thread A, as further described below under the description for FIG. 12, but does not suspend other threads, because the break-point condition is not yet satisfied, i.e., only one and not three threads have hit the break-point.

Referring again to FIG. 7, at time T21, thread B also hits the synchronization break-point at statement 331. Debug controller 122 also suspends thread B, but does not suspend other threads, because the break-point condition is not yet satisfied, i.e., only two and not three threads have hit the break-point.

Then at time T22, thread C hits the synchronization break-point at statement number 331. Debug controller 122 also suspends thread C. The break-point condition for all three threads (A, B, and C) is now satisfied since three threads are suspended, and as a result, all three are synchronized.

As a result of three threads hitting the break-point, so that the condition is satisfied, debug controller 122 suspends threads D and E at time T23, even though they have not yet hit the break-point at statement 331. Since thread C was the last thread to hit the multi-threaded break-point, thread C is the current thread of focus, so debug controller 122 brings up the user interface for thread C. In this example, the user chooses set sync continue command 310 from the user interface, which causes debug controller to allow threads A, B, and C to execute more instructions at time T24. Threads D and E remain suspended and do not execute more instructions, until such time as one or more of threads A, B, or C hit another break-point and the user enters another command.

Figure 8:
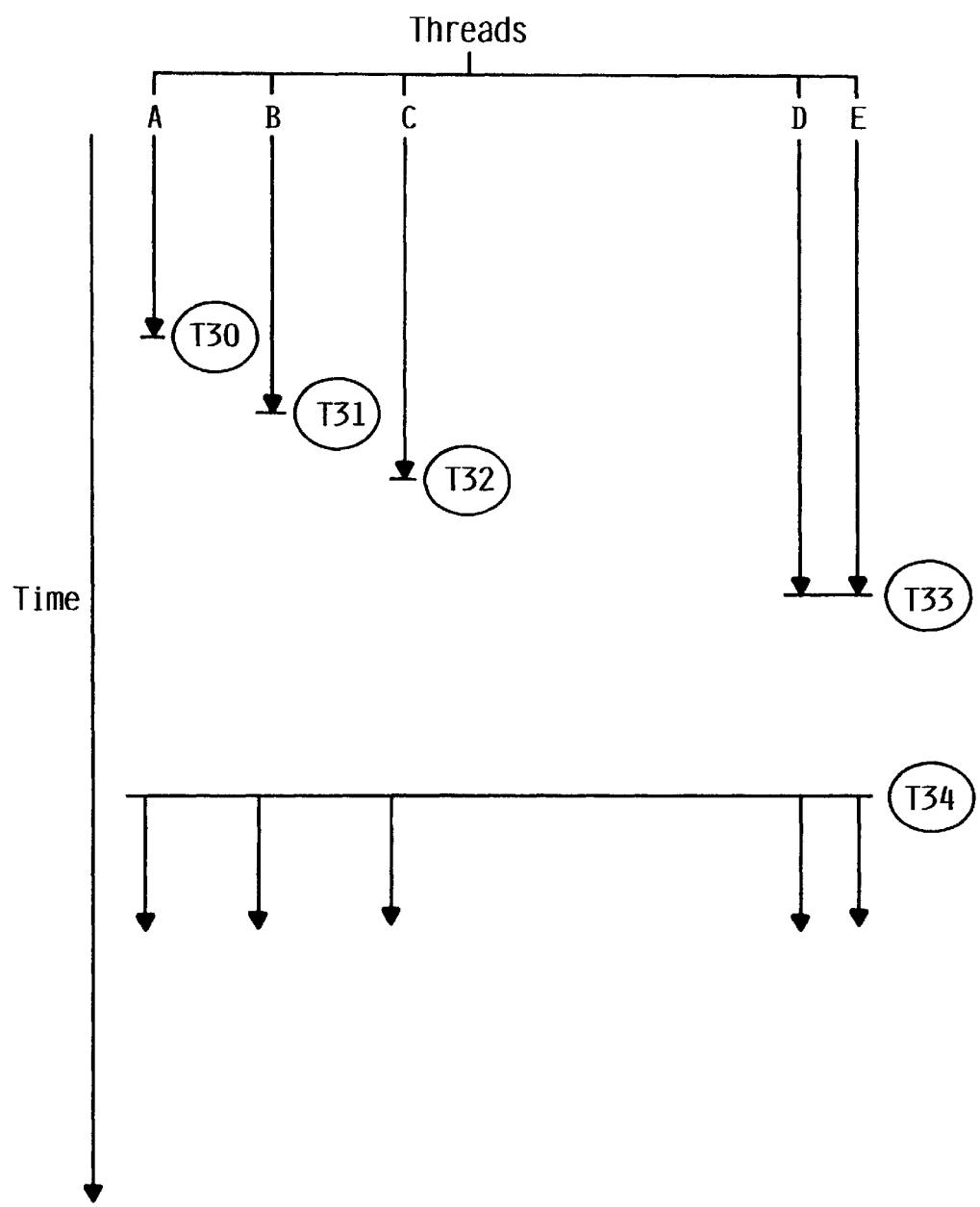
FIG. 8 is an illustrative example of using "continue" synchronization break-points, according to the preferred embodiment.

Referring to FIG. 8, a processing example for continue command 306 is illustrated. A depiction is made of five threads A, B, C, D, and E simultaneously executing after the user has entered a multi-threaded break command using, for example, halt-at-statement 355 set to statement "331" and number of threads set to "3". Time T30 is earlier than time T31, which is earlier than time T32, which is earlier than time T33, which is earlier than time T34.

At time T30, thread A hits the synchronization break-point at statement 331. Debug controller 122 suspends thread A, as further described below under the description for FIG. 12, but does not suspend other threads, because the break-point condition is not yet satisfied, i.e., only one and not three threads have hit the break-point.

Referring again to FIG. 8, at time T31, thread B also hits the synchronization break-point at statement 331. Debug controller 122 also suspends thread B, but does not suspend other threads, because the break-point condition is not yet satisfied, i.e., only two and not three threads have hit the break-point.

Then at time T32, thread C hits the synchronization break-point at statement number 331. Debug controller 122 also suspends thread C. The break-point condition for all three threads (A, B, and C) is now satisfied since three threads are suspended, and as a result, all three are synchronized.

As a result of three threads hitting the break-point, so that the condition is satisfied, debug controller 122 suspends threads D and E at time T33, even though they have not yet hit the break-point at statement 331. Since thread C was the last thread to hit the multi-threaded break-point, thread C is the current thread of focus, so debug controller 122 brings up the user interface for thread C. In this example, the user chooses continue command 312 from the user interface, which causes debug controller to allow all threads A, B, C, D, and E to execute more instructions at time T34.

Figures 1, 9A:
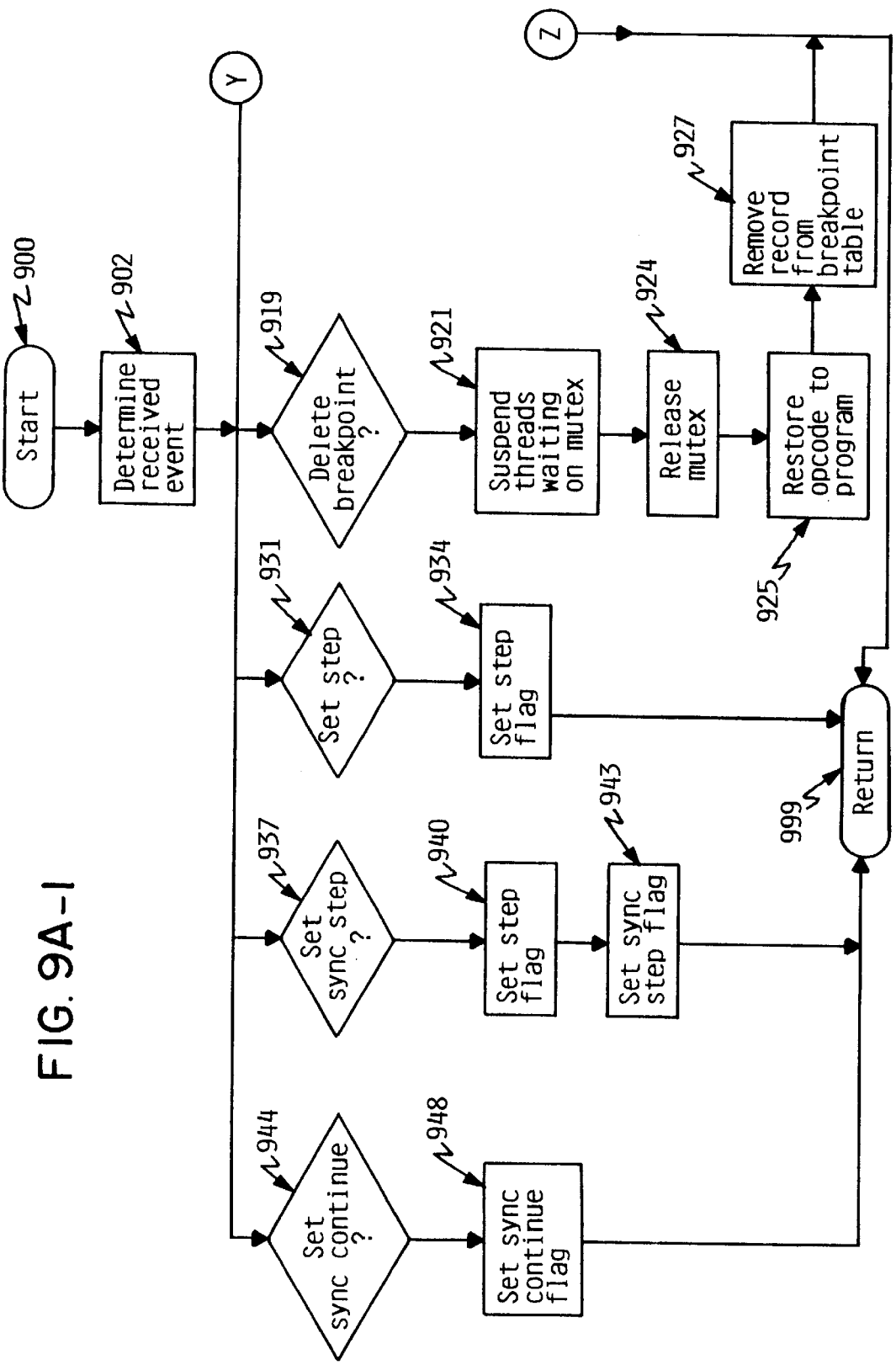
Figures 2, 9A:
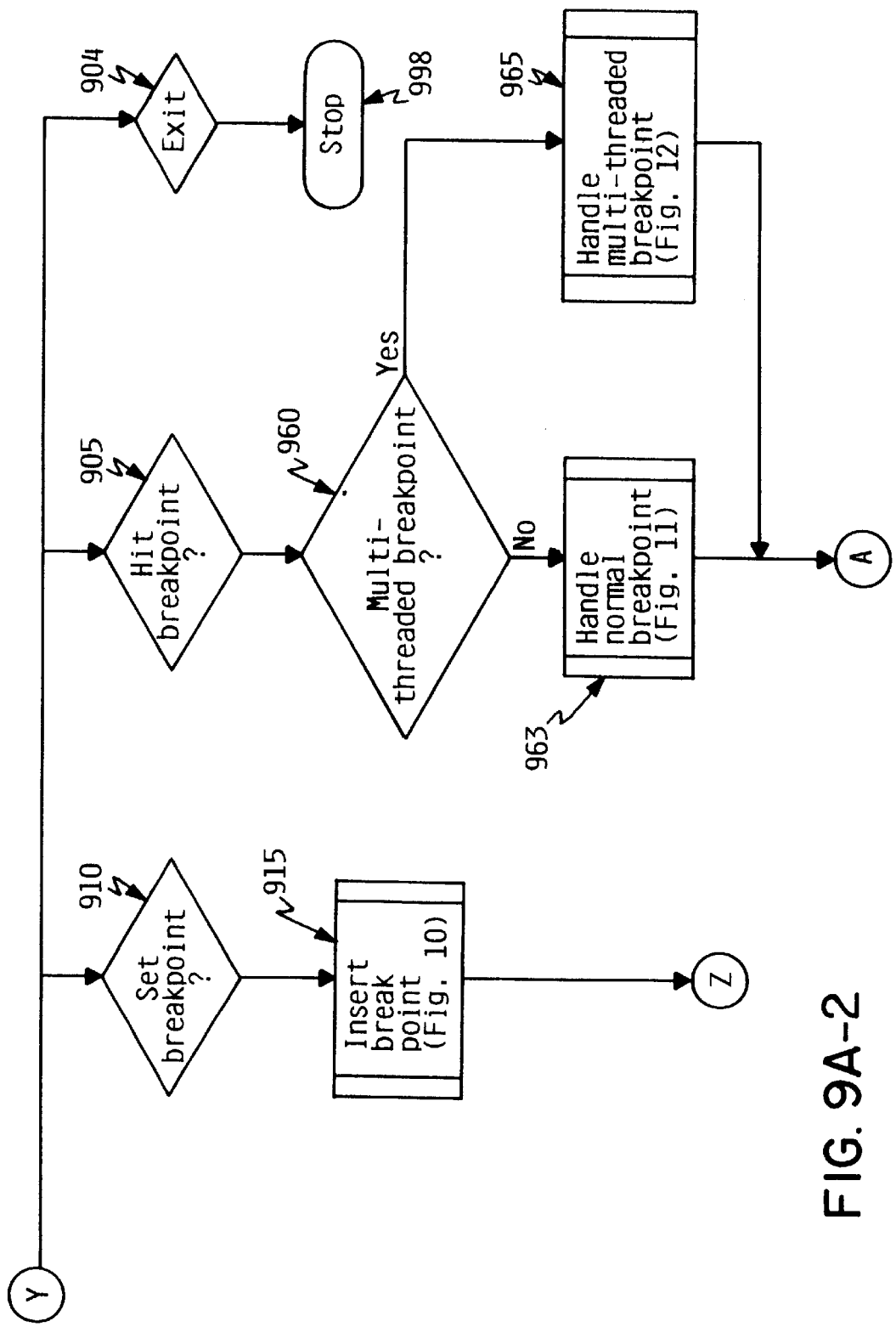

Referring to FIG. 9a, the main routine of debug controller 122 is illustrated that maintains break-points and responds to events. The logic of FIG. 9a is called when an event is received. At block 900, control begins. At block 902, debug controller 122 receives the event and determines what event was received.

If the event received at block 902 was a result of set break-point command 301, then control continues from block 902 to block 910. Control then continues to block 915 where debug controller 122 inserts the break-point specified by the user in dialog window 350 into break-point table 132. Control then continues to block 999 where the function returns.

If the event received at block 902 was a result of delete break-point command 304, then control continues from block 902 to block 919. Control then continues to block 921 where debug controller 122 suspends any threads that are waiting at a break-point. Control then continues to block 924 where debug controller releases mutex 425, which will allow the suspended threads to continue executing once they are released from the suspended state. Control then continues to block 925 where debug controller 122 restores opcode 410 to program 120. Control then continues to block 927 where debug controller 122 removes the record associated with the deleted break-point from break-point table 132. Control then continues to block 999 where the function returns.

Figure 11:
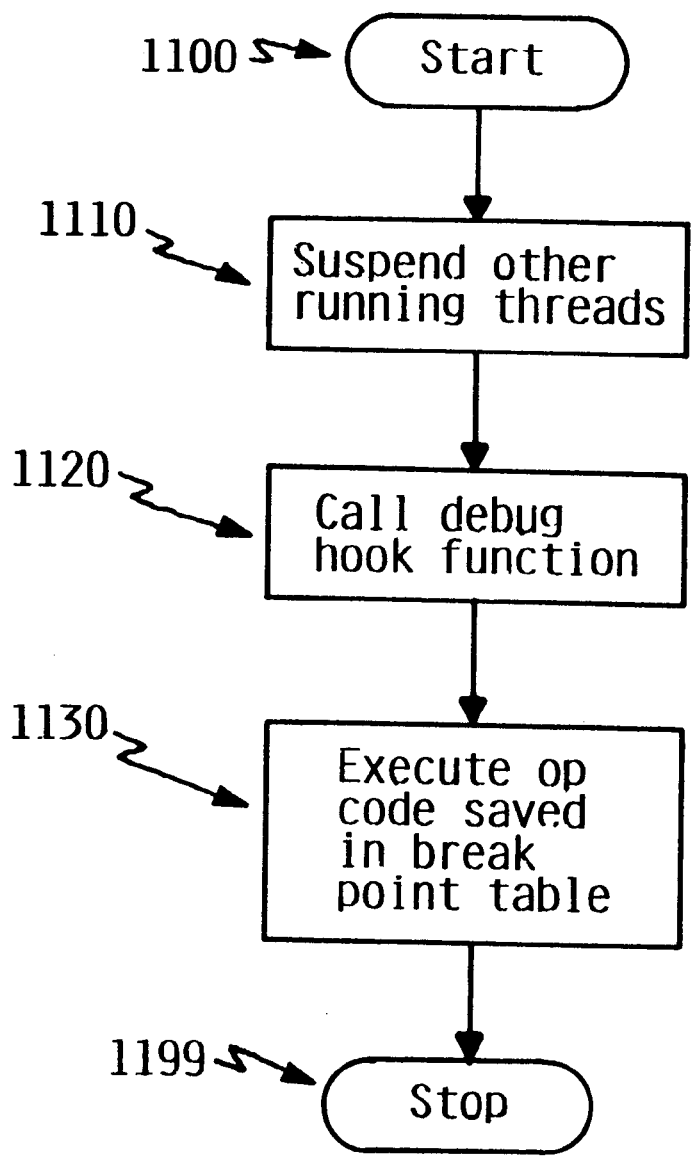
FIG. 11 is a flow diagram of the normal break-point routine, according to the preferred embodiment.
Figure 12:
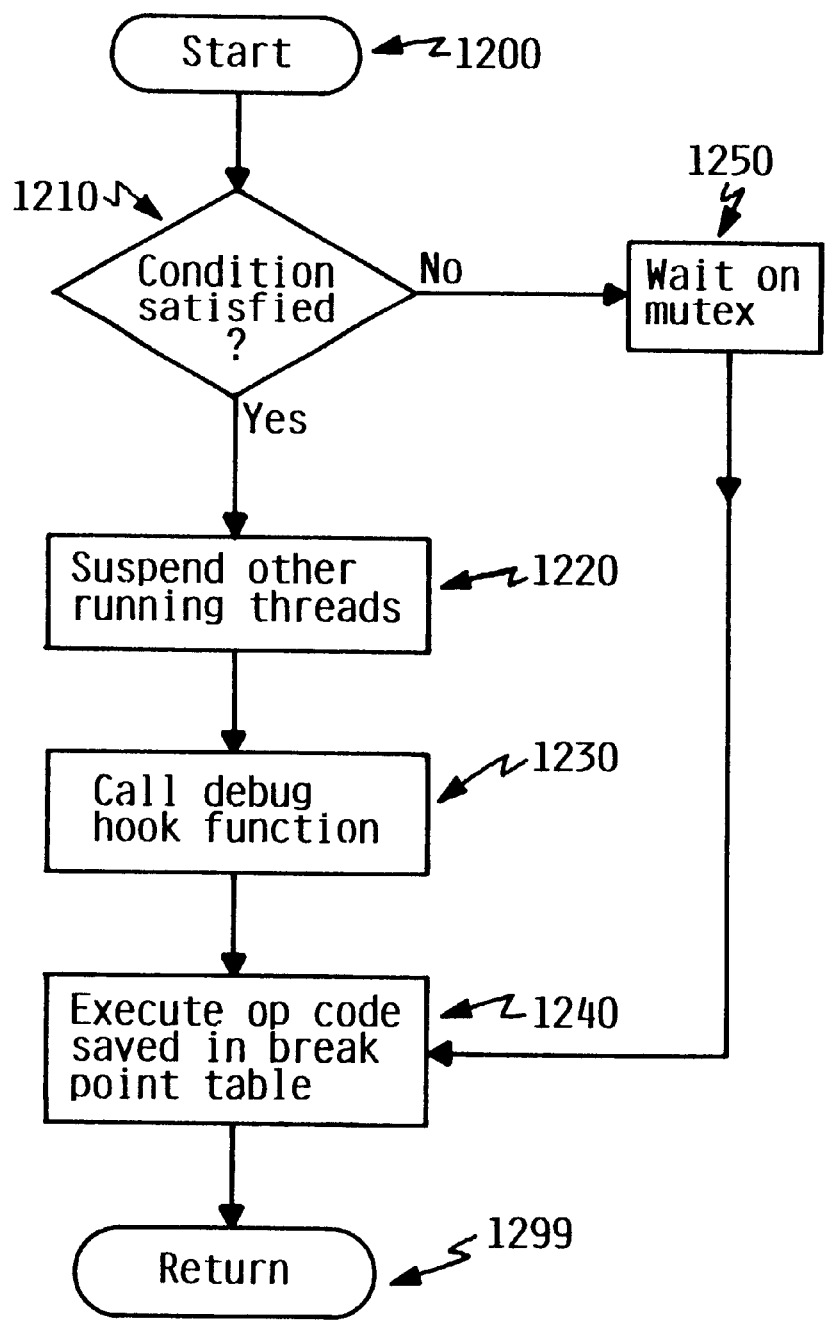
FIG. 12 is a flow diagram of the multi-threaded break-point routine, according to the preferred embodiment.

If the event received at block 902 was a hit break-point event, then control continues from block 902 to block 905. Control then continues to block 960 where debug controller 122 determines whether the hit break-point event is for a multi-threaded break-point. If the determination at block 960 is false, then control continues to block 963 where the handle normal break-point logic of FIG. 11 is called. Referring again to FIG. 9a, if the determination at block 960 is true, then control continues to block 965 where the handle multi-threaded break-point logic of FIG. 12 is called.

Figure 9B:
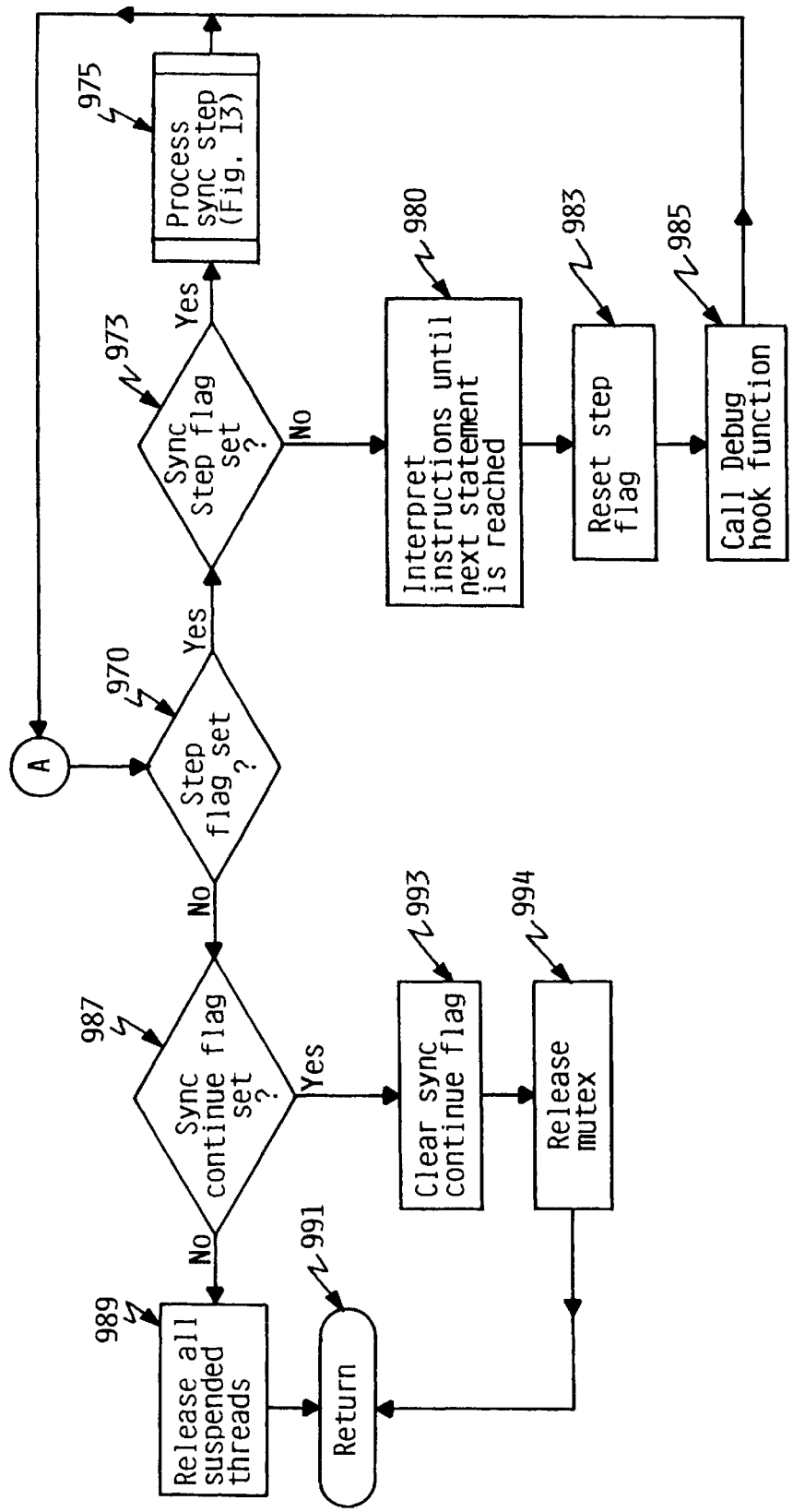

Referring to FIG. 9b, control then continues from either block 963 or 965 to block 970 where debug controller 122 determines whether the step flag is set.

If the determination at block 970 is true, then control continues to block 973 where debug controller 122 determines whether the sync step flag is set. If the determination at block 973 is true, then control continues to block 975 where debug controller 122 performs the sync step operation, as further described below under the description for FIG. 13. Referring again to FIG. 9b, control then returns to block 970.

If the determination at block 973 is false, then control continues to block 980 where debug controller 122 causes instructions in program 120 for the current thread to be executed until the next statement is reached. Control then continues to block 983 where debug controller resets the step flag. Control then continues to block 985 where debug controller 122 calls debug hook 134, which displays the user interface and processes user commands, as previously described above under the description for FIG. 3a. Referring again to FIG. 9b, control then returns to block 970.

If the determination at block 970 is false, then control continues to block 987 where debug controller 122 determines whether the sync continue flag is set. If the determination at block 987 is true, then control continues to block 993 where debug controller 993 clears the sync continue flag. Control then continues to block 994 where debug controller 122 releases the mutex for the current thread, which allows only the threads waiting on the break-point to run. The mutex for the current thread is stored in the break-point record associated with the current break-point. Control then continues to block 991 where the function returns. If the determination at block 987 is false, then control continues to block 989 where debug controller 989 releases all threads, which allows the threads to resume executing instructions. Control then continues to block 991 where the function returns.

Referring to FIG. 9a, if the event received at block 902 was a result of set sync continue command 310, then control continues from block 902 to block 944. Control then continues to block 948 where debug controller 122 sets the sync continue flag. Control then continues to block 999 where the function returns.

If the event received at block 902 was a result of set sync step command 308, then control continues from block 902 to block 937. Control then continues to block 940 where debug controller 122 sets the set step flag. Control then continues to block 943 where debug controller sets the set sync step flag. Control then continues to block 999 where the function returns.

If the event received at block 902 was a result of set step command 306, then control continues from block 902 to block 931. Control then continues to block 934 where debug controller 122 sets the set step flag. Control then continues to block 999 where the function returns.

If the event received at block 902 was an exit event, then control continues from block 902 to block 904. Control then continues to block 998 where the function stops.

Figure 10:
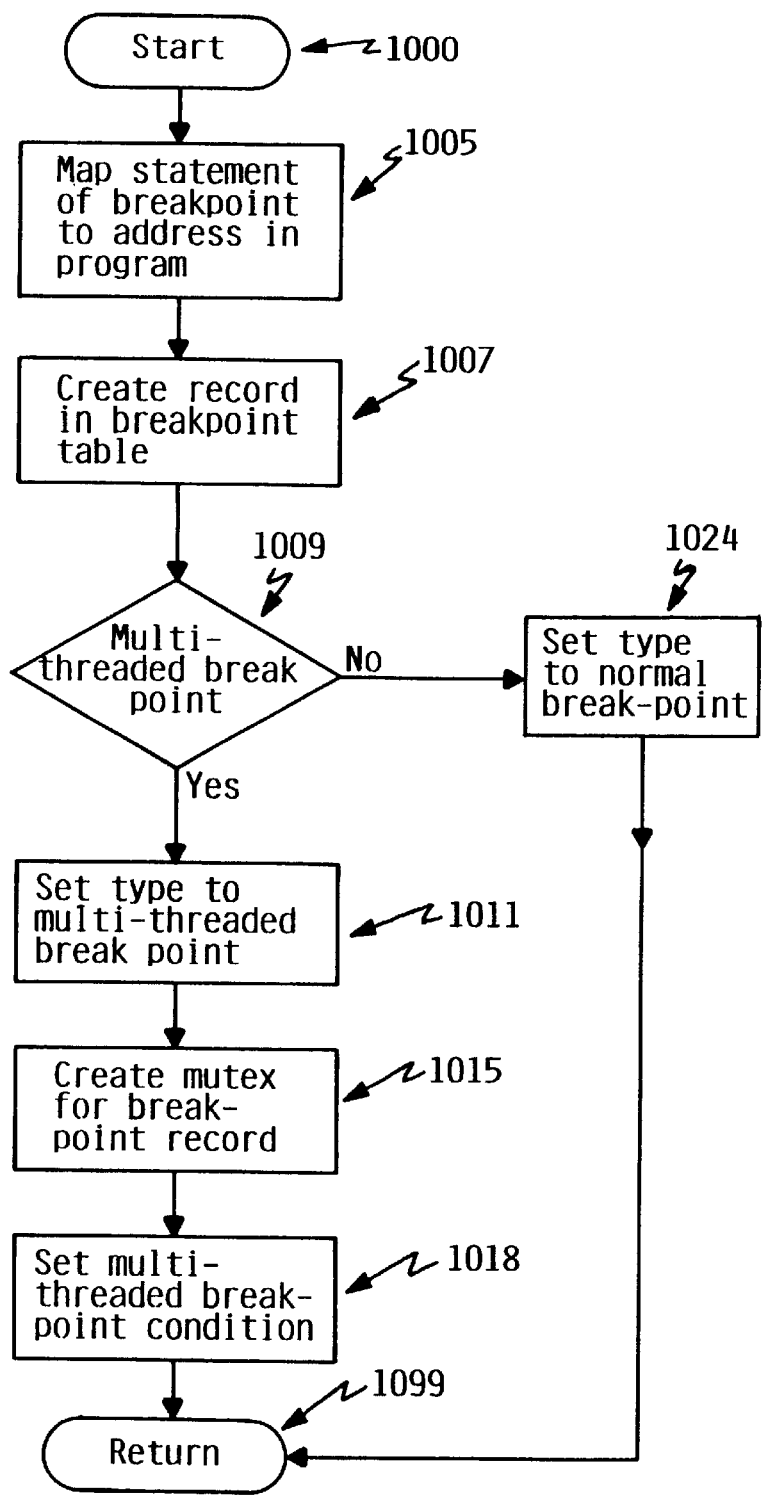
FIG. 10 is a flow diagram of the add break-point routine, according to the preferred embodiment.

Referring to FIG. 10, there is illustrated logic for a function within debug controller 122 that creates a break-point. At block 1000 control starts. Control then continues to block 1005 where debug controller 122 maps the statement specified in set break-point command 301 to an address in program 120. Control then continues to block 1007 where debug controller creates a record in break-point table 132. Debug controller 122 sets address field 405 to be the mapped address determined in block 1005. Debug controller 122 sets opcode 410 to be the instruction that resides at address 405 in program 120. Debug controller initializes counter 440 to be zero. Debug controller 122 also inserts an invalid instruction in program 120 at the mapped address from block 1005. Control then continues to block 1009 where debug controller 122 determines whether the user requested multi-threaded break-point command 302. If the determination at block 1009 is true, then control continues to block 1011 where debug controller 122 sets type field 430 to be a multi-threaded break-point. Control then continues to block 1015 where debug controller sets mutex field 425, so that threads that hit the break-point will wait. Control then continues to block 1018 where debug controller sets multi-threaded condition field 420 to be the condition specified in FIG. 3b. Referring again to FIG. 10, control then continues to block 1099 where the function returns.

If the determination at block 1009 is false, then control continues to block 1024 where debug controller 122 sets type field 430 to be a normal break-point. Control then continues to block 1099 where the function returns.

Referring to FIG. 11, there is illustrated logic for a function within debug controller 122 that handles a normal, non-multi-threaded, break-point event, which occurs when execution of program 120 has hit a normal break-point. At block 1100 control starts. Control then continues to block 1110 where debug controller 122 suspends all other running threads. Control then continues to block 1120 where debug controller 122 calls debug hook function 134, which displays the user interface described in FIG. 3a and processes commands from the user. Referring again to FIG. 11, control then continues to block 1130 where debug controller executes the instruction saved in op code 410. Control then continues to block 1199 where the function returns.

Referring to FIG. 12, there is illustrated logic for a function within debug controller 122 that handles a multi-threaded break-point event, which occurs when execution of program 120 has hit a multi-threaded break-point. At block 1200, control starts. Control then continues to block 1210 where debug controller 122 determines whether the condition in multi-threaded condition field 420 has been satisfied. If the determination at block 1210 is true, then control continues to block 1220 where debug controller 122 suspends all other running threads. Control then continues to block 1230 where debug controller 122 calls debug hook function 134, which displays the user interface described in FIG. 3a and processes commands from the user. Control then continues to block 1240 where debug controller executes the instruction saved in op code 410. Control then continues to block 1299 where the function returns.

If the determination at block 1210 is false, then control continues to block 1250 where debug controller 122 waits until the mutex is released somewhere else in the logic of debug controller 122, for example at blocks 924, 994, or 1320. Referring again to block 1250, control then continues to block 1299 where the function returns.

Figure 13:
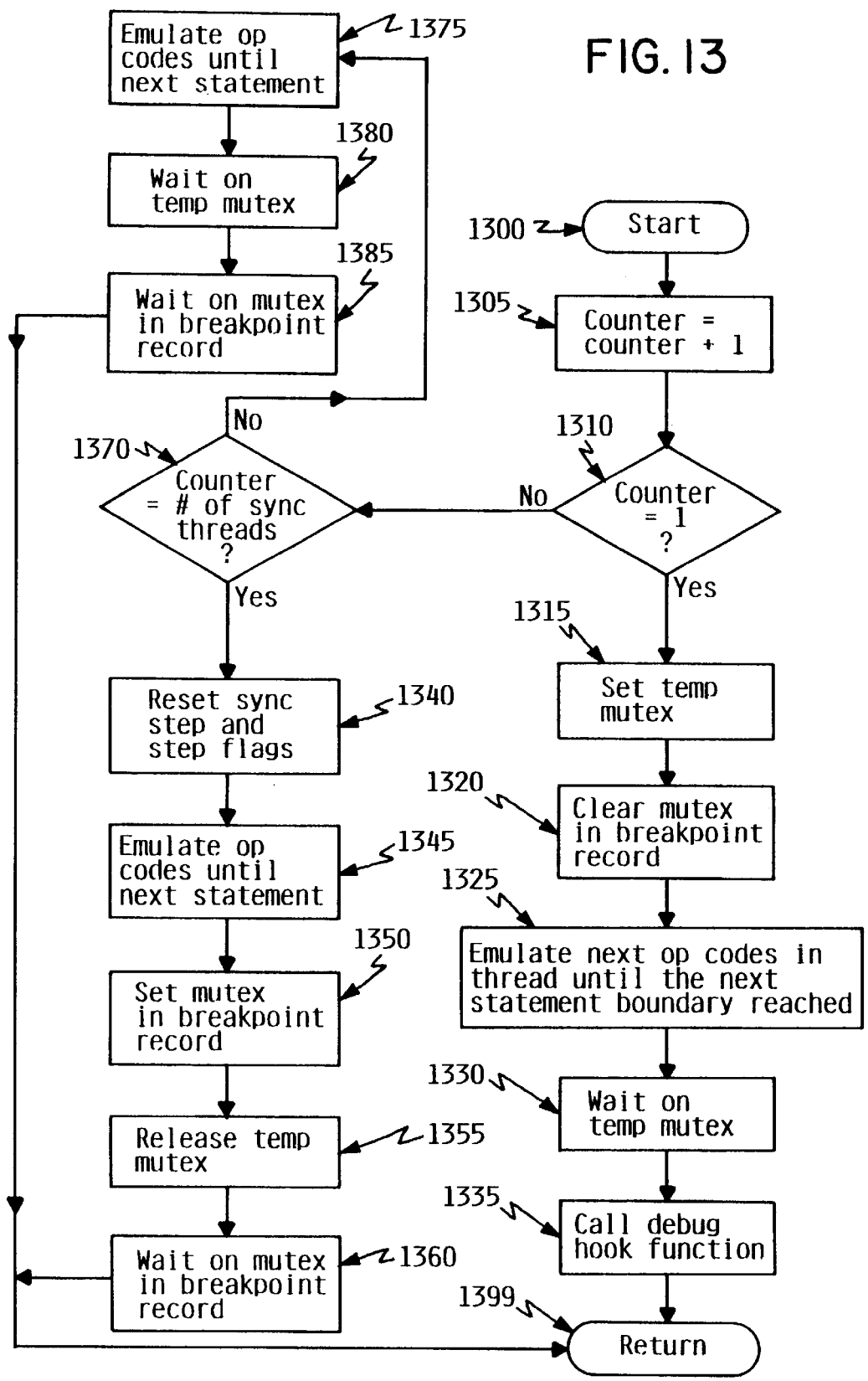
FIG. 13 is a flow diagram of the sync step routine, according to the preferred embodiment.

Referring to FIG. 13, there is illustrated logic for a function within debug controller 122 that handles a sync step operation after a break-point has been hit. At block 1300, control starts. Control then continues to block 1305 where debug controller 122 increments counter 440 in the break-point table record associated with the current thread. Control then continues to block 1310 where debug controller 122 determines whether counter equals one. If the determination at block 1310 is true, then control continues to block 1315 where debug controller 122 sets a temporary mutex. Control then continues to block 1320 where debug controller 122 clears mutex 425 in the entry associated with the current thread in break-point table 132. Control then continues to block 1325 where debug controller 122 emulates the next op codes in the current thread until the next statement boundary is reached. Control then continues to block 1390 where debug controller waits for the temporary mutex previously set in block 1315 to be cleared, which will occur as described below under the description for block 1355. Referring again to block 1390, control then continues to block 1335 where debug controller 122 calls debug hook function 134, which displays the user interface and processes user commands, as previously described above under the description for FIG. 3a. Referring again to FIG. 13, control then continues to block 1399 where the function returns.

If the determination at block 1310 is false, then control continues to block 1370 where debug controller 122 determines whether counter 440 equals number-of-synchronized threads 380. If the determination at block 1370 is true, the control continues to block 1340 where debug controller resets the sync step and step flags. Control then continues to block 1345 where debug controller 122 emulates the opcodes in program 120 until the next statement is reached. When the next statement is reached, control continues to block 1350 where debug controller 122 sets mutex 425 in the break-point table entry associated with the current thread. Control then continues to block 1355 where debug controller releases the temporary mutex, which was previously set in block 1315. Control then continues to block 1360 where debug controller 122 waits on mutex 425 in the break-point table entry associated with the current thread. Control then continues to block 1399 where the function returns.

If the determination at block 1370 is false, then control continues to block 1375 where debug controller 122 emulates the opcodes in program 120 until the next statement is reached. Control then continues to block 1380 where controller 122 waits for the temporary mutex to be released. When the temporary mutex is released, control continues to block 1385 where debug controller waits on mutex 425 in the break-point table entry associated with the current thread. Control then continues to block 1399 where the function returns.

In another embodiment, instead of inserting invalid instructions to force a system exception, break-points may constitute valid instructions that directly perform the break-point manager actions to process the break-point. These valid instructions may be inserted into the computer program 120 or be in the form of a "patch," with a branch instruction placed in the program 120.

Other modifications will be apparent to one of ordinary skill in the art. Therefore, the invention lies solely in the claims hereinafter appended.

What is claimed is:

1. A method of synchronizing execution of a multi-thread program, comprising the computer-executed steps:

executing the multi-thread program, wherein the multi-thread program comprises a plurality of threads;

halting execution of a first thread at a synchronization break-point;

while the first thread is halted, continuing execution of other of the plurality of threads that have not yet reached the synchronization break-point;

thereafter determining that a synchronization break condition has been satisfied, while said first thread remains halted, wherein said synchronization break condition includes at least one condition from the set consisting of:

(a) determining that a pre-determined number of the plurality of threads have reached the synchronization break-point, (b) determining that a pre-determined amount of time has elapsed since said first thread reached the synchronization break-point, and (c) determining that a user-specified thread has reached the synchronization break-point; and responsive to determining that a synchronization break condition has been satisfied, halting execution of all threads of said multi-thread program.

2. The method of claim 1, further comprising:

halting any of the other threads that subsequently reach the synchronization break-point before said step of determining that a break condition has been satisfied.

3. The method of claim 1, wherein the break condition further comprises:

determining that a pre-determined number of the plurality of threads have reached the synchronization break-point.

4. The method of claim 3, wherein the predetermined number is user-specified.

5. The method of claim 1, wherein the break condition further comprises:

determining that a pre-determined amount of time has elapsed since said first thread reached the synchronization break-point.

6. The method of claim 5, wherein the pre-determined amount of time is user-specified.

7. The method of claim 1, wherein the break condition further comprises:
   determining that a user-specified thread has reached the synchronization break-point.
8. The method of claim 1, further comprising:
   executing a next statement after the synchronization break-point in a last thread that was halted.
9. The method of claim 1, further comprising:
   executing a next statement after the synchronization break-point in all threads that were halted.
10. The method of claim 1, further comprising:
    resuming execution of the other threads that have not reached the synchronization break-point.
11. An apparatus comprising:
    a processor;
    a memory coupled to the processor;
    a multi-threaded program resident in memory and executing on the processor, the program comprising a plurality of threads; and
    a debug controller, resident in the memory and executing on the processor, wherein the debug controller is configured to execute a portion of the multi-threaded program for debugging, wherein the debug controller, when read and executed by the processor, comprises steps of:
       executing the multi-thread program, wherein the multi-thread program comprises a plurality of threads,
       halting execution of a first thread at a synchronization break-point,
       while the first thread is halted, continuing execution of other of the plurality of threads that have not yet reached the synchronization break-point;
       thereafter determining that a synchronization break condition has been satisfied, while said first thread remains halted, wherein said synchronization break condition includes at least one condition from the set consisting of:
          (a) determining that a pre-determined number of the plurality of threads have reached the synchronization break-point,
          (b) determining that a pre-determined amount of time has elapsed since said first thread reached the synchronization break-point, and
          (c) determining that a user-specified thread has reached the synchronization break-point; and
       responsive to determining that a synchronization break condition has been satisfied, halting execution of all threads of said multi-threaded program.
12. The apparatus of claim 11, further comprising:
    halting any of the other threads that subsequently reach the synchronization break-point before said step of determining that a break condition has been satisfied.
13. The apparatus of claim 11, wherein the break condition further comprises:
    determining that a pre-determined number of the plurality of threads have reached the synchronization break-point.
14. The apparatus of claim 13, wherein the predetermined number is user-specified.
15. The apparatus of claim 11, wherein the break condition further comprises:
    determining that a pre-determined amount of time has elapsed since said first thread reached the synchronization break-point.
16. The apparatus of claim 15, wherein the pre-determined amount of time is user-specified.
17. The apparatus of claim 11, wherein the break condition further comprises:
    determining that a user-specified thread has reached the synchronization break-point.
18. The apparatus of claim 11, further comprising:
    executing a next statement after the synchronization break-point in a last thread that was halted.
19. The apparatus of claim 11, further comprising:
    executing a next statement after the synchronization break-point in all threads that were halted.
20. The apparatus of claim 11, further comprising:
    resuming execution of the other threads that have not reached the synchronization break-point.
21. The apparatus of claim 11, further comprising a break-point table, wherein the break-point table defines the synchronization break-points.
22. A program product, comprising:
    a debug controller configured to execute a portion of multi-thread program for debugging, the program comprising a plurality of threads, and the debug controller is configured to execute a portion of the multi-threaded program for debugging, wherein the debug controller, when read and executed by the processor, comprises steps of:
       executing the multi-thread program, wherein the multi-thread program comprises a plurality of threads,
       halting execution of a first thread at a synchronization break-point,
       while the first thread is halted, continuing execution of other of the plurality of threads that have not yet reached the synchronization break-point;
       thereafter determining that a synchronization break condition has been satisfied, while said first thread remains halted, wherein said synchronization break condition includes at least one condition from the set consisting of:
          (a) determining that a pre-determined number of the plurality of threads have reached the synchronization break-point,
          (b) determining that a predetermined amount of time has elapsed since said first thread reached the synchronization break-point, and
          (c) determining that a user-specified thread has reached the synchronization break-point; and; and
       responsive to determining that a break condition has been satisfied, halting execution of all threads of said multi-thread program.
23. The program product of claim 22, further comprising:
    halting any of the other threads that subsequently reach the synchronization break-point before said step of determining that a break condition has been satisfied.
24. The program product of claim 22, wherein the break condition further comprises:
    determining that a pre-determined number of the plurality of threads have reached the synchronization break-point.
25. The program product of claim 24, wherein the pre-determined number is user-specified.
26. The program product of claim 22, wherein the break condition further comprises:
    determining that a pre-determined amount of time has elapsed since said first thread reached the synchronization break-point.
27. The program product of claim 26, where in the pre-determined amount of time is user-specified.
28. The program product of claim 22, wherein the break condition further comprises:

determining that a user-specified thread has reached the synchronization break-point.

29. The program product of claim 22, further comprising:
executing a next statement after the synchronization break-point in a last thread that was halted.

30. The program product of claim 22, further comprising:
executing a next statement after the synchronization break-point in all threads that were halted.

31. The program product of claim 22, further comprising:
resuming execution of the other threads that have not reached the synchronization break-point.

32. The program product of claim 22, further comprising a break-point table, wherein the break-point table defines the synchronization break-point.

* * * * *